United States Patent [19]
Walker et al.

[11] Patent Number: 5,573,298
[45] Date of Patent: Nov. 12, 1996

[54] ENERGY ABSORBING VEHICLE DOOR WITH GUARD BEAM LOAD DISTRIBUTOR

[75] Inventors: Lee A. Walker, Shelby Township; Srinivasan Sundararajan, Belleville; Geoffrey D. Fletcher, Detroit; Daniel J. Dillmann, Belleville, all of Mich.

[73] Assignee: Ford Motor Company, Dearborn, Mich.

[21] Appl. No.: 639,666

[22] Filed: Apr. 29, 1996

Related U.S. Application Data

[62] Division of Ser. No. 363,079, Dec. 23, 1994, Pat. No. 5,542,738.

[51] Int. Cl.$^6$ ........................................................... B60J 5/04
[52] U.S. Cl. ........................ 296/188; 296/189; 296/146.6
[58] Field of Search .................................. 296/146.6, 188, 296/189, 153; 49/502; 280/751

[56] References Cited

U.S. PATENT DOCUMENTS

| 4,272,103 | 6/1981 | Schmid et al. | 280/751 |
|---|---|---|---|
| 4,783,114 | 11/1988 | Welch | 296/153 |
| 5,048,234 | 9/1991 | Lau et al. | 296/189 |
| 5,306,066 | 4/1994 | Saathoff | 296/146.6 |
| 5,395,135 | 3/1995 | Lim et al. | 296/189 |

FOREIGN PATENT DOCUMENTS

| 231246 | 9/1990 | Japan | 280/751 |
|---|---|---|---|

*Primary Examiner*—Gary C. Hoge
*Attorney, Agent, or Firm*—David B. Kelley

[57] ABSTRACT

An automotive vehicle occupant compartment is bounded by an energy absorbing vehicle door comprising an outer panel, an inner panel joined to the outer panel and defining a space therebetween, a guard beam mounted longitudinally in the space, a trim panel mounted on an occupant compartment side of the inner panel and having a plurality of energy absorbing bolsters attached thereto generally laterally adjacent the guard beam, and load distribution means mounted in the space laterally between the guard beam and the energy absorbing bolsters for distributing a load imparted to the guard beam evenly across the energy absorbing bolsters so as to preserve the energy absorption bolsters in a substantially undeformed state prior to occupant contact with the door during a side impact type collision.

12 Claims, 3 Drawing Sheets

ENERGY ABSORBING VEHICLE DOOR WITH GUARD BEAM LOAD DISTRIBUTOR

This is a divisional application under 37 CFR 1 60, of pending prior application Ser. No. 08/363,079 filed Dec. 23, 1994 now U.S. Pat. No. 5,542,738 of (inventors) Lee A. Walker, Srinivasan Sundararajan, Geoffrey D. Fletcher and Daniel J. Dillmann.

FIELD OF THE INVENTION

The present invention relates generally to doors and side panels for vehicles and, more particularly, to an energy absorbing vehicle door having a load distributor positioned between a guard beam and energy absorbing blocks.

BACKGROUND OF THE INVENTION

Vehicle doors are typically constructed with two or more panels attached to the door frame, including an exterior or outer panel for shielding the passenger compartment from the elements, and an inner door panel which provides structural support. A trim panel is usually fastened to the inner door panel facing the passenger compartment and shields the vehicle occupants from internal door components, such as the window, the window regulator, and the door locks. The trim panel can also provide aesthetic qualities to the interior passenger compartment as well as ergonomic features, for example, easily accessible door handles, mirror and window controls, and the like.

To lessen the effects of a side collision type impact of the vehicle occupant seating area, some vehicle door constructions may include a door intrusion guard beam, side bolsters of foam or honeycomb construction, or other body side structural upgrades. Positioning of these devices often depends on vehicle door design, but takes into account the spatial relationship of an occupant seating area adjacent the door. In vehicle door designs in which the guard beam is laterally aligned with an energy absorbing bolster, a side impact collision may cause localized deformation of the bolster potentially decreasing its energy absorption effectiveness. This results since the guard beam typically has a smaller occupant facing cross-sectional area than the bolster.

SUMMARY OF THE INVENTION

A new and improved energy absorbing door trim system is provided to enhance side impact performance. The door comprises an outer panel, an inner panel joined to the outer panel and defining a space therebetween, a guard beam mounted longitudinally in the space, a trim panel mounted on an occupant compartment side of the inner panel and having a plurality of energy absorbing bolsters attached thereto generally laterally adjacent the guard beam, and load distribution means mounted in the space laterally between the guard beam and the energy absorbing bolsters for distributing a load imparted to the guard beam evenly across the energy absorbing bolsters so as to preserve the energy absorbing bolsters in a substantially undeformed state prior to occupant contact with the door during a side impact type collision. Preferably, the energy absorbing bolsters are foam material blocks. The load distribution means can comprise a foam distributor block carried with the guard beam, or alternatively can be a metal or plastic plate attached to either the guard beam or an energy absorbing bolster.

During a side collision type impact, the impacting object intrudes into the door outer panel causing it to deflect toward the inner panel. This, in turn, causes the load distribution means, which is either carried with the guard beam or the energy absorbing bolster, to contact the bolster in a manner which distributes the load evenly thereacross. By distributing the load imparted to the door this way, the full effectiveness of the bolster is available to help cushion a vehicle occupant, thus producing desirable occupant responses.

One advantage of the present invention is that a door mounted energy absorbing bolster is not locally deformed by the door guard beam prior to occupant contact with the door.

Another advantage of the present invention is that it does not require extensive door redesign or major modification to production tooling.

Still another advantage is that the load distribution means is inexpensive to manufacture and relatively easy to assemble.

An advantage of the foam distributor block of the present invention is that it is light weight compared to other known countermeasures.

A feature of the present invention is a load distribution means mounted between the guard beam and an energy absorbing bolster in a vehicle door to preserve the energy absorption bolster in a substantially undeformed state prior to occupant contact with the door during a side impact type collision.

BRIEF DESCRIPTION OF THE DRAWINGS

These and other advantages and features of the present invention will be apparent to those skilled in the automotive body arts upon reading the following description with reference to the accompanying drawings, in which.

DETAILED DESCRIPTION OF THE PREFERRED EMBODIMENTS

Figure 1:
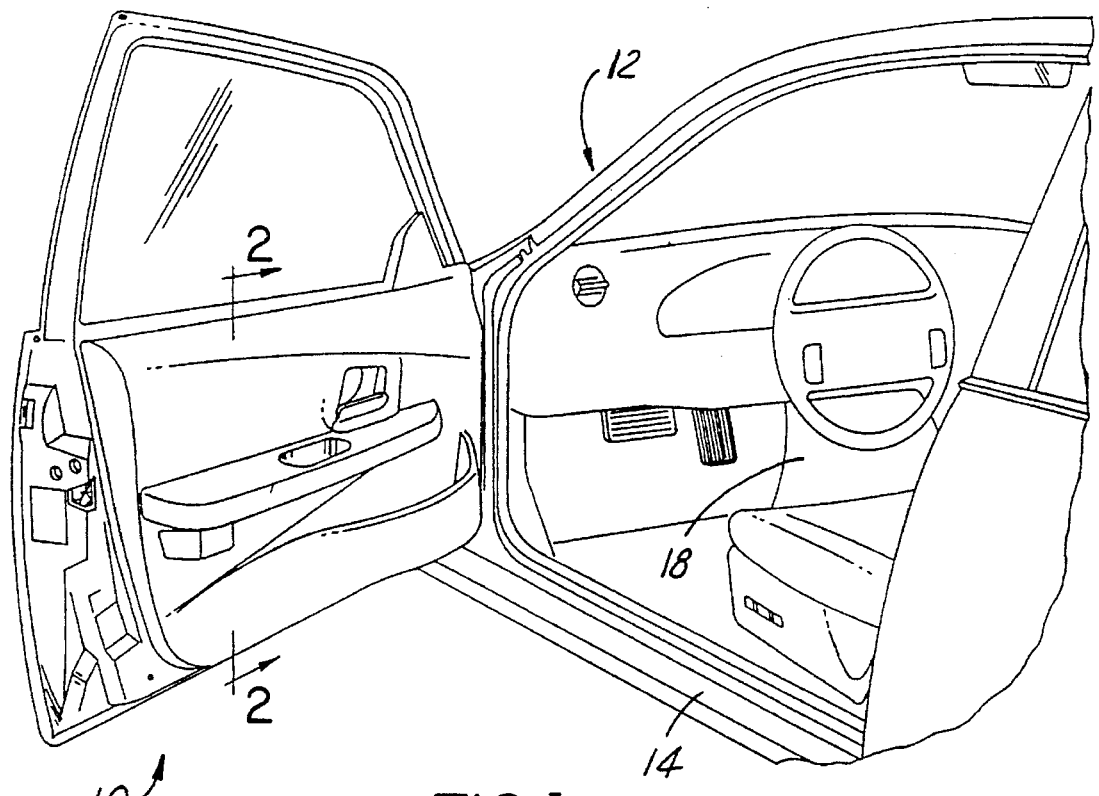
FIG. 1 is a partial perspective view of a vehicle occupant compartment bounded by an energy absorbing vehicle door according to the present invention.

Turning now to the drawings, and in particular FIG. 1 thereof, an energy absorbing vehicle door 10, according to the present invention, is illustrated in operational relationship with a vehicle, generally indicated at 12, such as an automotive vehicle (partially shown). More specifically, the energy absorbing vehicle door 10 is illustrated in operational relationship with a rocker panel 14 of the vehicle 12 and an occupant seating area, generally indicated at 18. It should be appreciated that the rocker panel 14 is stationary and connected to the structure of the vehicle 12 and that the vehicle door 10 is moveable and connected to the remaining structure of the vehicle 12 as is known in the art.

Figure 2:
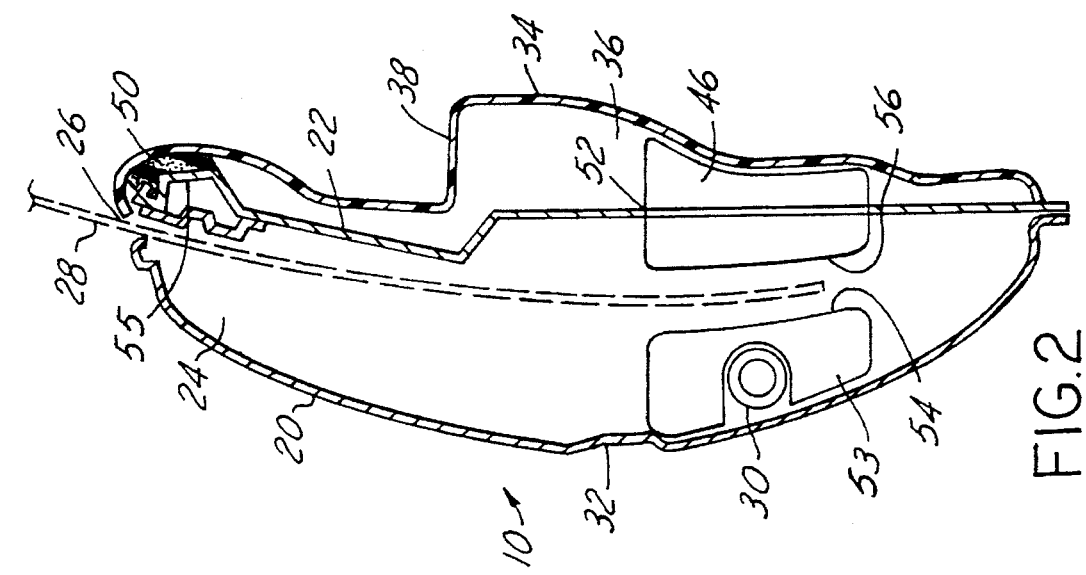
FIG. 2 is a side elevational view through a vehicle door with an extruded tube guard beam showing a load distributor block attached thereto according to a first embodiment of the present invention.

As seen in FIG. 2, the energy absorbing vehicle door 10 includes an outer panel 20 and an inner panel, generally indicated at 22, joined together in conventional fashion to form a space 24 therebetween. Door 10 also includes an aperture 26 at an upper end for receiving a window 28, which may move in and out of the space 24. A window regulator device, a door latch, and other components (not shown) of a vehicle door as known in the art may also be housed in space 24.

Figure 4:
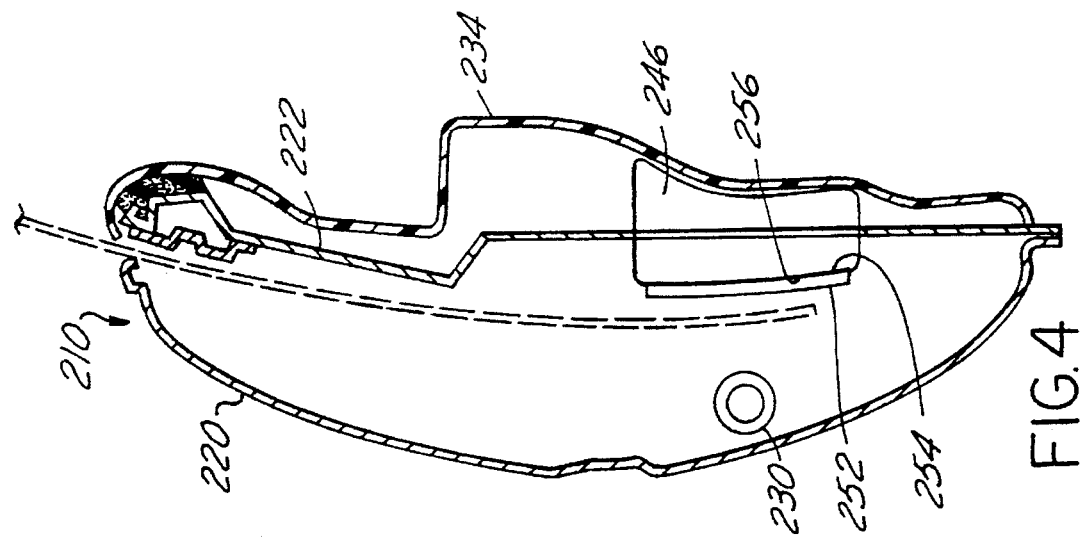
FIG. 4 is a side elevational view through a vehicle door with an extruded tube guard beam showing a load distributor plate attached to an energy absorbing bolster according to a third embodiment of the present invention.
Figure 3:
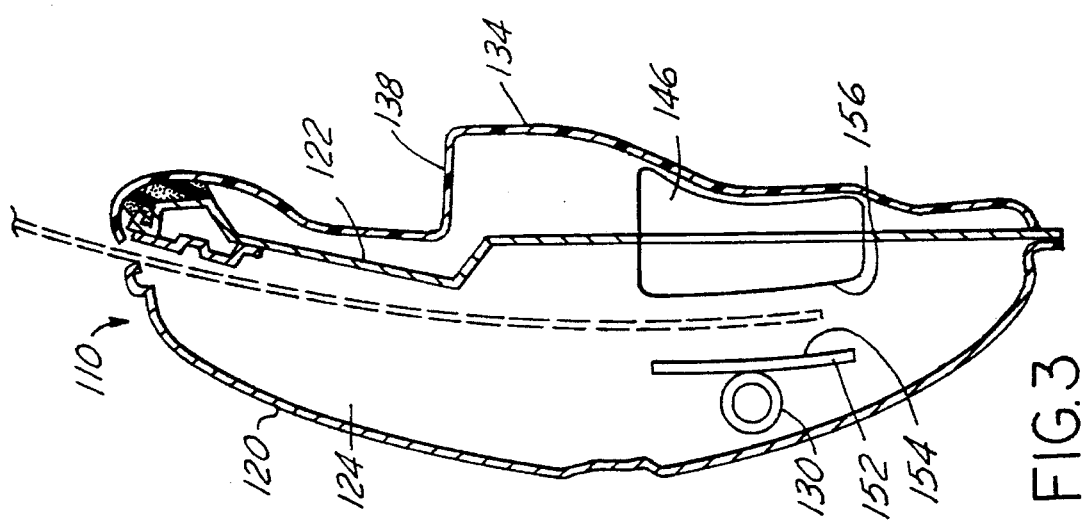
FIG. 3 is a side elevational view through a vehicle door with an extruded tube guard beam showing a load distributor plate attached thereto according to a second embodiment of the present invention.
Figure 7:
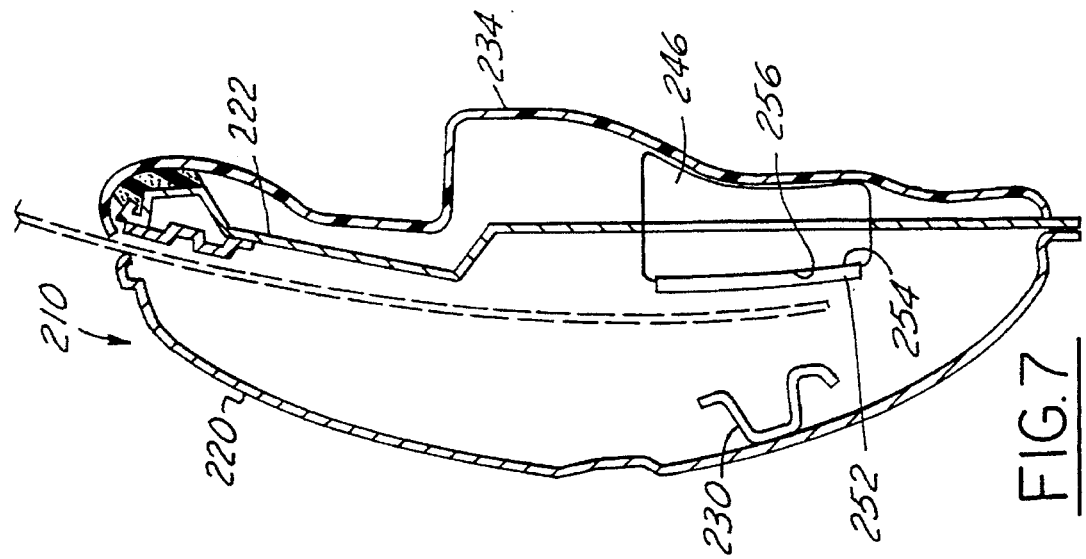
FIG. 7 is a side elevational view similar to FIG. 4 but shown with a stamped channel guard beam.
Figure 6:
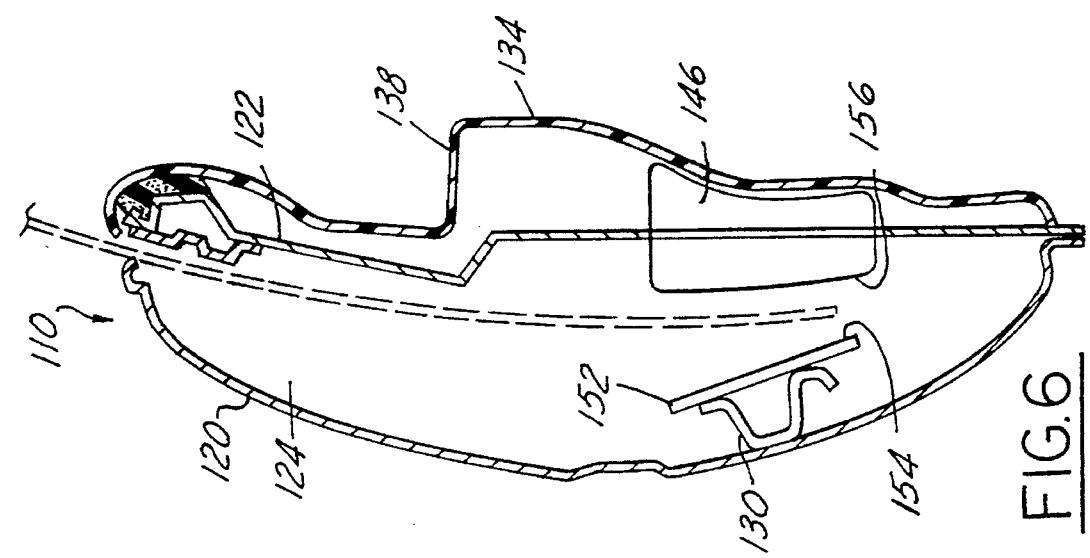
FIG. 6 is a side elevational view similar to FIG. 3 but shown with a stamped channel guard beam.
Figure 5:
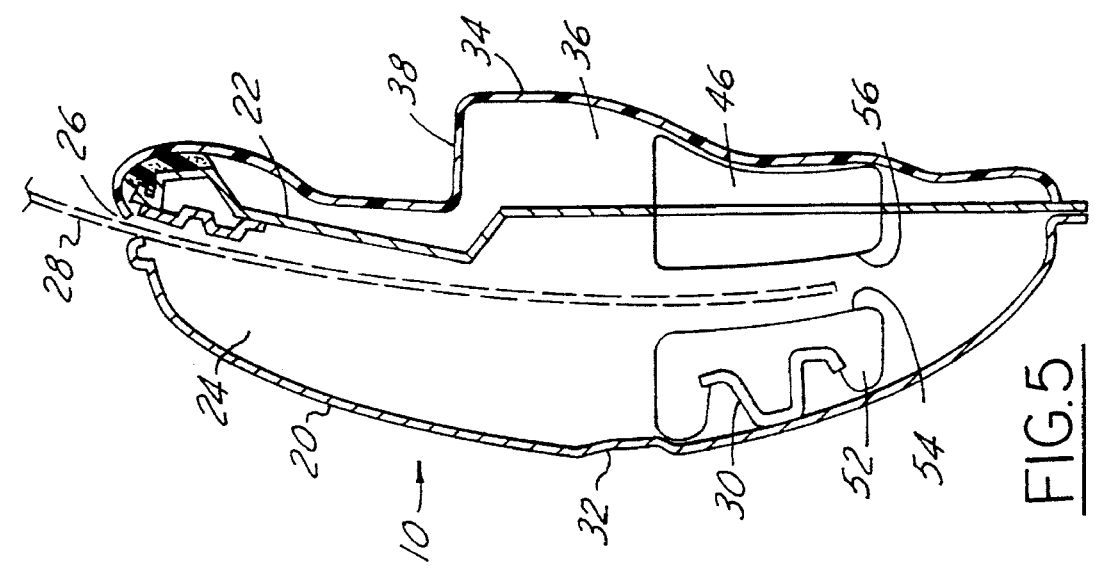
FIG. 5 is a side elevational view similar to FIG. 2 but shown with a stamped channel guard beam.

The energy absorbing vehicle door 10 further includes an intrusion or door guard beam 30 extending longitudinally in the space 24 between the outer and inner panels 20, 22 and is secured therein by suitable means such as hem-flanging and/or welding. Alternatively, although not shown, intrusion beam 30 can be secured by similar means on an exterior surface 32 of outer panel 20 as is known in the art. Guard beam 30 may be an extruded tube, as shown in FIGS. 2–4, or can be a stamped channel, as seen in FIGS. 5–7, and preferably is made of a metal material.

Still referring to FIG. 2, a door trim panel 34 is mounted on the inner panel 22 to form a space 36 therebetween. The door trim panel 34 includes an arm rest 38 generally facing the occupant seating area 18. Preferably, the trim panel 34 is fixedly secured to the inner panel 22 by suitable fasteners (not shown) such as a screw and clip arrangement. Other fastening means may also be used, such as Christmas tree fasteners, push pins, or other fasteners known to those skilled in the art and suggested by this disclosure.

Preferably, the outer panel 20 and inner panel 22 are made of a metal material or other suitable materials. The door trim panel 34 is made of a suitable material such as plastic, cloth, vinyl, leather, carpeting, cardboard, wood fiber, or a combination thereof.

Figure 8:
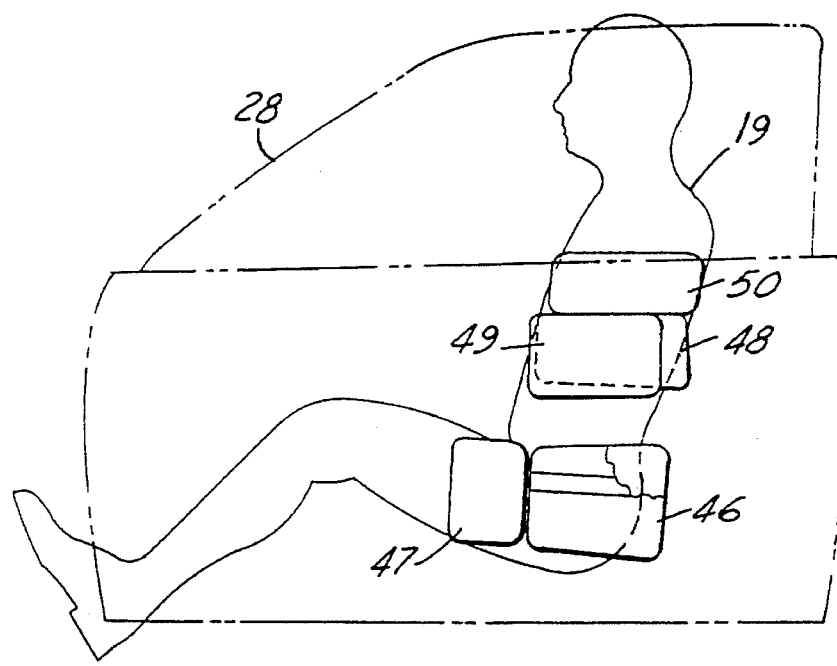
FIG. 8 is a side elevational view of an energy absorbing vehicle door, according to the present invention, illustrated in operational relationship with an occupant.

In FIG. 8, it is seen that the energy absorbing vehicle door 10 further includes at least one, and preferably a plurality, of energy absorbing bolsters 46, 47, 48, 49, 50. The energy absorbing bolsters 46, 47, 48, 49, 50 are, preferably, foam material blocks made from polyurethane foam, but may also be made of other suitable materials such as expanded beads, aluminum or paper honeycomb. The energy absorbing bolsters 46, 47 may have different crush strengths, shapes and thicknesses as required for protection of the pelvis and leg regions of the occupant 19. Crush strengths between 20–45 psi are typical for bolsters 46, 47.

The energy absorbing bolsters 48, 49, 50 are, preferably, of different crush strengths, shapes and thicknesses for protection of the chest region of the occupant 19. Crush strengths of 5–20 psi are typical for bolsters 48, 49, 50. It should be noted that the embodiments of the energy absorbing door in FIGS. 2–7 do not show the bolsters 47, 48, 49, but those skilled in the art will realize that door 10 may include those bolsters.

Referring again to FIG. 2, the energy absorbing bolster 46 is disposed through an aperture 52 in the inner panel 22 proximate the occupant seating area 18, partially extending into the space 24 between the outer panel 20 and the inner panel 22, and partially in the space 36 between the inner panel 22 and the trim panel 34. The bolster 46 is mounted to the trim panel 34 by suitable means such as an adhesive, for example. An upper energy absorbing bolster 50 may be disposed in the space 36 near the upper end 55 of the inner panel 22. The energy absorbing bolster 50 is mounted to either the inner panel 22 or door trim panel 34 by suitable means such as an adhesive as previously described, or alternatively, may be trapped between the inner panel 22 and door trim panel 34, as shown.

In a first embodiment of the present invention shown in FIGS. 2 and 5, a foam load distributor block 53 is attached to an inner-panel-facing side of the guard beam 30 in space 24 between the guard beam 30 and the energy absorbing bolster 46. Preferably, distributor block 53 is molded of a polyurethane material to fit the particular shape of the guard beam 30 but is generally rectangular in shape and has a face 54 aligned laterally outward of the energy absorbing bolster 46. The load distributor block 53 has a predetermined crush strength which preferably is greater than or equal to the crush strength of the energy absorbing bolster 46. Distributor block 53 may have any suitable shape and preferably face 54 thereof has a surface area greater than or equal to the surface area of energy absorbing bolster face 56. Guard beam 30 may be an extruded tube (FIG. 2) or a stamped channel (FIG. 5).

In operation, the energy absorbing vehicle door 10 may be subject to a side collision type impact which causes lateral displacement of the outer panel 20 and the guard beam 30 toward the inner panel 22. Distributor block 53, which is carried with guard beam 30, contacts face 56 of bolster 46 and distributes the load imparted to the guard beam 30 evenly across the bolster 46 so as to preserve it in a substantially undeformed state prior to occupant contact with the door 10. In this state, the bolster 46 is capable of managing energy more efficiently to better cushion the occupant.

Referring now to FIGS. 3 and 6, a second embodiment of the present invention is shown. Like parts of the vehicle door 110 have like reference numerals increased by one hundred (100). Door 110 has an outer panel 120, an inner panel 122, and a trim panel 134 similar to door 10 with an arm rest 138 generally facing the occupant seating area. Guard beam 130 may be an extruded tube (FIG. 3) or a stamped channel (FIG. 6). The energy absorbing vehicle door 110 has a plate 152 attached to an inner-panel-facing side of the guard beam 130 in space 124 between the guard beam 130 and the energy absorbing bolster 146. A face 154 of plate 152 is aligned laterally outward of the energy absorbing bolster 146. Preferably, plate 152 is made of a metal or plastic material, and, if metal, is welded to guard beam 130 in conventional fashion. The plate 152 may have any suitable shape and preferably face 154 thereof has a surface area greater than or equal to the surface area of the face 156 on energy absorbing bolster 146.

The energy absorbing vehicle door 110 operates in a manner similar to door 10 described above. In a side collision type impact, the outer panel 120 and the guard beam 130 deflect toward the inner panel 122. Plate 152, which is carried with guard beam 130, contacts face 156 of bolster 146 and distributes the load imparted to the guard beam 130 evenly across the energy absorbing bolster 146 so as to preserve it in a substantially undeformed state prior to occupant contact with the door 110. In this state, the bolster 146 is capable of managing energy more efficiently to better cushion the occupant.

A third embodiment of the present invention is shown in FIGS. 4 and 7. Like parts of the vehicle door 210 have like reference numerals increased by two hundred (200). Door 210 has an outer panel 220, an inner panel 222, and a trim panel 234 similar to doors 10 and 110. Guard beam 230 may be an extruded tube (FIG. 4) or a stamped channel (FIG. 7). The energy absorbing vehicle door 210 has a metal plate 252 attached to face 256 of energy absorbing bolster 246, preferably by an adhesive, or other attachment means known to those skilled in the art and suggested by this disclosure. Plate 252 is generally rectangular in shape with a face 254 aligned laterally inward of the guard beam 230. The plate 252 may have any suitable shape and preferably face 254 thereof has a surface area greater than or equal to the surface area of the face 256 on energy absorbing bolster 246.

In the event of a side collision type impact, the outer panel 220 and the guard beam 230 deflect toward the inner panel 222. Guard beam 230 contacts face 254 of plate 252, which is carried with bolster 246, and distributes the load evenly across the energy absorbing bolster 246 so as to preserve it in a substantially undeformed state prior to occupant contact with the door 210. In this state, the bolster 246 is capable of managing energy more efficiently to better cushion the occupant.

Those skilled in the art will realize that the energy absorbing vehicle doors 10, 110 and 210 may eliminate the moveable window and have a fixed window (not shown) secured in a recess between the outer panel 20 and the inner panel 22.

The present invention has been described in an illustrative manner. It is to be understood that the terminology which has been used is intended to be in the nature of words of description rather than of limitation. It should be appreciated that the present invention has the same working principles applied to doors and body side panels of automotive vehicles. Although the preferred embodiments of the present invention have been disclosed, various changes and modifications may be made without departing from the scope of the invention as set forth in the appended claims.

We claim:

1. An energy absorbing vehicle door, comprising:
   an outer panel;
   an inner panel joined to the outer panel;
   a guard beam mounted on the door laterally outward of the inner panel;
   a trim panel mounted on the inner panel and having energy absorbing means attached thereto generally laterally adjacent the guard beam; and
   at least one load distribution plate mounted to the energy absorbing means for distributing a load imparted to the guard beam evenly across the energy absorbing means so as to preserve the energy absorption means in a substantially undeformed state prior to occupant contact with the door during a side impact type collision.

2. An energy absorbing vehicle door as set forth in claim 1 wherein the energy absorbing means comprises a plurality of energy absorbing bolsters.

3. An energy absorbing vehicle door as set forth in claim 2 wherein the plurality of energy absorbing bolsters are foam material blocks.

4. An energy absorbing vehicle door as set forth in claim 1 wherein the at least one plate is made of a metal material.

5. An energy absorbing vehicle door as set forth in claim 1 wherein the at least one plate is made of a plastic material.

6. An energy absorbing vehicle door as set forth in claim 1 wherein the at least one plate is secured to an outer-panel-facing side of the energy absorbing means.

7. An energy absorbing vehicle door as set forth in claim 1 wherein the at least one plate has a deformation strength greater than the crush strength of the energy absorbing foam blocks.

8. In an automotive vehicle occupant compartment having an occupant seating area therein and bounded on one side by an energy absorbing vehicle door, the door comprising:
   an outer panel;
   an inner panel joined to the outer panel and defining a space therebetween;
   a guard beam mounted longitudinally in the space;
   a trim panel mounted on an occupant compartment side of the inner panel and having a plurality of energy absorbing bolsters attached thereto generally laterally adjacent the guard beam; and
   at least one load distribution plate mounted to an outer-panel-facing side of the energy absorbing bolsters for distributing a load imparted to the door evenly across the energy absorbing bolsters so as to preserve the energy absorption bolsters in a substantially undeformed state prior to occupant contact with the door during a side impact type collision.

9. An energy absorbing vehicle door as set forth in claim 8 wherein the energy absorbing bolsters are foam material blocks.

10. An energy absorbing vehicle door as set forth in claim 8 wherein the load distribution plate is made of a plastic material.

11. An energy absorbing vehicle door as set forth in claim 8 wherein the load distribution plate is made of a metal material.

12. An energy absorbing vehicle door as set forth in claim 8 wherein the at least one distribution plate has a deformation strength greater than the crush strength of the energy absorbing bolsters.

* * * * *